United States Patent
Dombek

(10) Patent No.: US 11,143,271 B2
(45) Date of Patent: Oct. 12, 2021

(54) CAGE FOR A TURBOMACHINE SPEED REDUCER WITH PLANETARY GEAR SET

(71) Applicant: SAFRAN TRANSMISSION SYSTEMS, Colombes (FR)

(72) Inventor: Alexis Claude Michel Dombek, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/763,527

(22) PCT Filed: Nov. 6, 2018

(86) PCT No.: PCT/FR2018/052740
§ 371 (c)(1),
(2) Date: May 12, 2020

(87) PCT Pub. No.: WO2019/097136
PCT Pub. Date: May 23, 2019

(65) Prior Publication Data
US 2020/0332858 A1    Oct. 22, 2020

(30) Foreign Application Priority Data

Nov. 17, 2017 (FR) .................................. 1760850

(51) Int. Cl.
*F16H 1/28* (2006.01)
*F02C 7/36* (2006.01)
(Continued)

(52) U.S. Cl.
CPC ............ *F16H 1/2827* (2013.01); *F02C 7/36* (2013.01); *F16H 57/043* (2013.01);
(Continued)

(58) Field of Classification Search
CPC .. F16H 1/2827; F16H 57/043; F16H 57/0471; F16H 57/082
See application file for complete search history.

(56) References Cited

U.S. PATENT DOCUMENTS 3,227,006 A * 1/1966 Bowen, Jr. ............ F16H 1/2827
                                                            475/347
5,466,198 A * 11/1995 McKibbin ................. F02C 7/36
                                                            475/346

(Continued)

FOREIGN PATENT DOCUMENTS

EP    1464869 A1    10/2004
FR    1379451 A     11/1964

(Continued)

OTHER PUBLICATIONS

International Search Report received for PCT Patent Application No. PCT/FR2018/052740, dated Jan. 31, 2019, 5 pages (2 pages of English Translation and 3 pages of Original Document).

*Primary Examiner* — Stacey A Fluhart
(74) *Attorney, Agent, or Firm* — Womble Bond Dickinson (US) LLP

(57) ABSTRACT

The invention relates to a planet-carrier (230) cage (234) for a turbomachine speed reducer (110) with a planetary gear set, said cage being designed such that it can contain a central sun wheel (151) with an axis of rotation X and an annular row of planets (150) arranged around the axis X and engaged with said sun wheel, the cage comprising axial receiving elements (280) on the periphery thereof, for receiving axial arms (282) secured to a barrel (242) of said reducer, a substantially radial finger (288) passing through each receiving element and being used to guide the rotation of a ball joint (286) carried by one of said arms, characterised in that each finger comprises means (294, 295) for lubricating said ball joint.

9 Claims, 4 Drawing Sheets

(51) Int. Cl.
*F16H 57/04* (2010.01)
*F16H 57/08* (2006.01)

(52) U.S. Cl.
CPC ..... *F16H 57/0471* (2013.01); *F16H 57/0479* (2013.01); *F16H 57/0486* (2013.01); *F16H 57/082* (2013.01); *F05D 2220/323* (2013.01); *F05D 2260/40* (2013.01)

(56) References Cited

U.S. PATENT DOCUMENTS

| | | | | |
|---|---|---|---|---|
| 6,223,616 B1 * | 5/2001 | Sheridan | ............... | F16H 1/2827 184/6.12 |
| 8,667,688 B2 * | 3/2014 | McCune | ................... | F02C 7/32 29/893.1 |
| 8,900,083 B2 * | 12/2014 | Sheridan | ............. | F16H 57/0424 475/160 |
| 9,103,413 B2 * | 8/2015 | Curti | ......................... | F02C 7/36 |
| 2009/0111639 A1 * | 4/2009 | Klingels | ................. | F01D 15/12 475/347 |
| 2010/0303626 A1 * | 12/2010 | Mostafi | ................... | F03D 15/00 416/170 R |
| 2013/0225353 A1 | 8/2013 | Gallet et al. | | |
| 2014/0274531 A1 * | 9/2014 | Sheridan | ............... | F16C 23/045 475/159 |

FOREIGN PATENT DOCUMENTS

| | | |
|---|---|---|
| FR | 2987416 A1 | 8/2013 |
| FR | 3041054 A1 | 3/2017 |
| WO | 94/29614 A1 | 12/1994 |
| WO | 2009/080030 | 7/2009 |
| WO | 2009/080031 A2 | 7/2009 |
| WO | 2010/092263 A1 | 8/2010 |

* cited by examiner

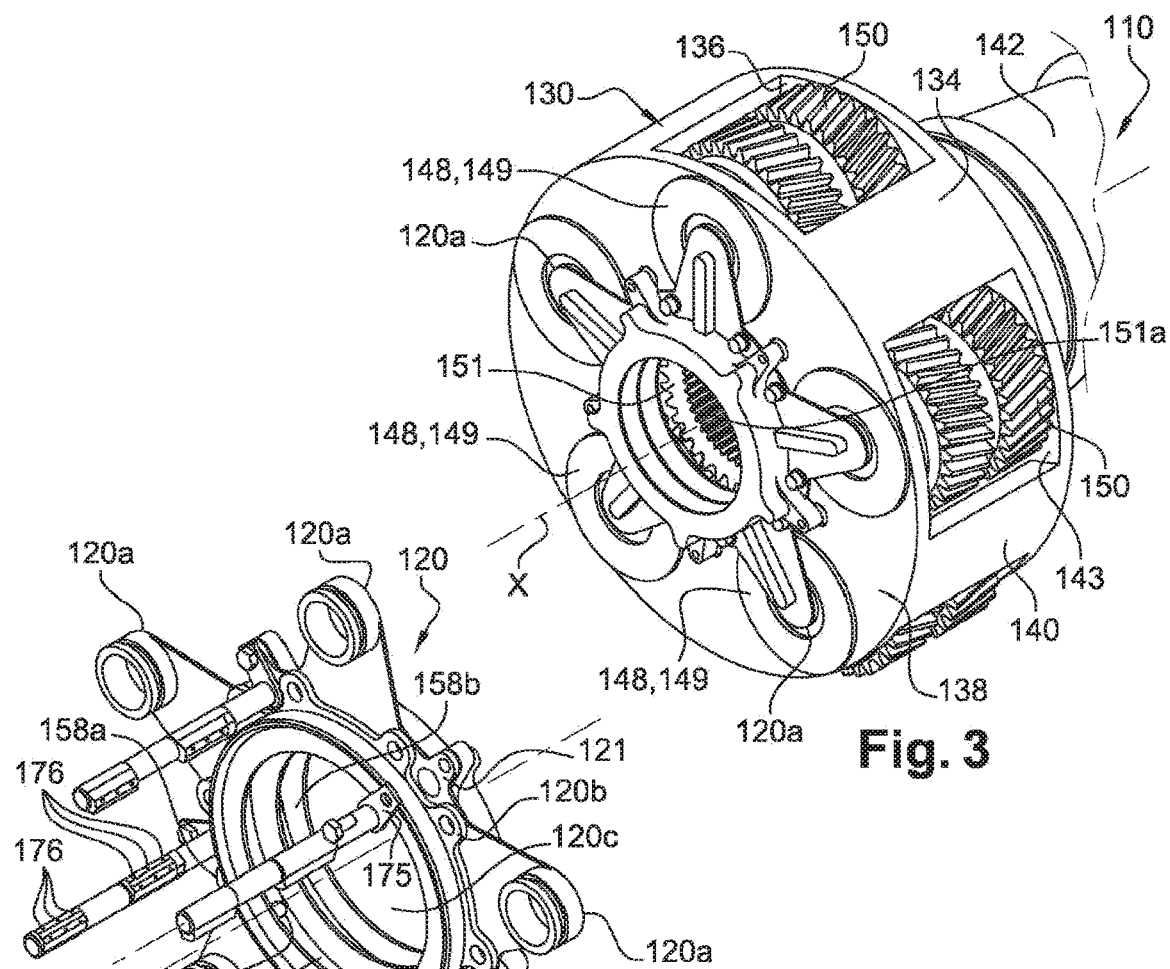
Fig. 3
Fig. 4
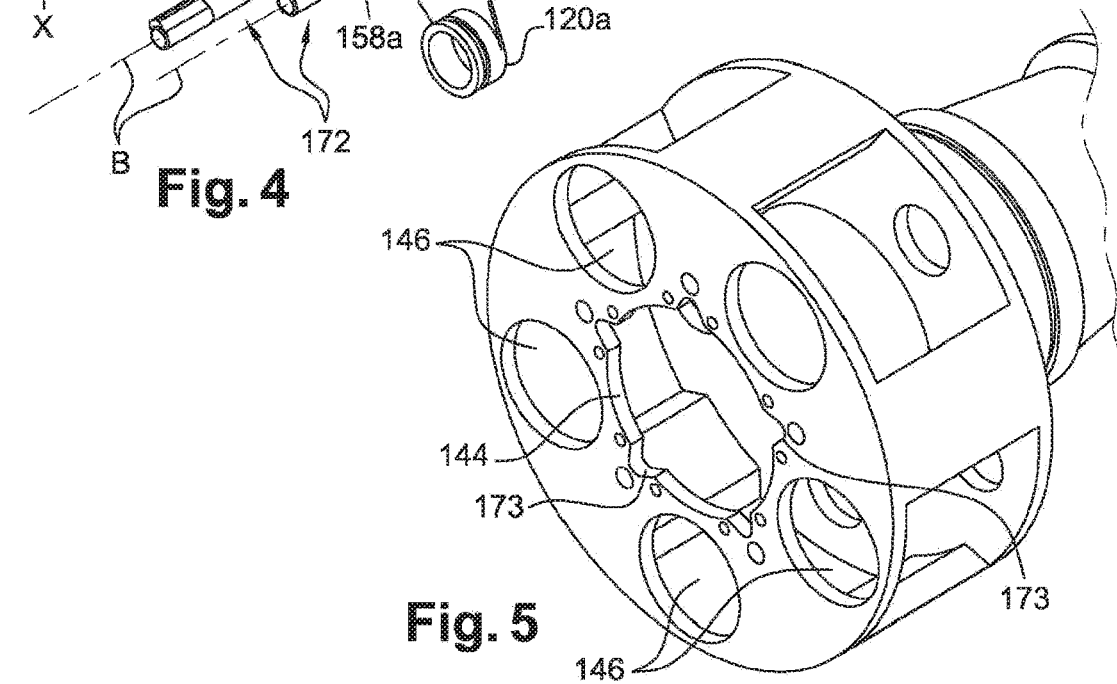
Fig. 5

CAGE FOR A TURBOMACHINE SPEED REDUCER WITH PLANETARY GEAR SET

FIELD OF THE INVENTION

The present invention relates to the field of turbine engine speed reducers with a planetary gear train or with an epicyclic gear train, in particular for an aircraft.

STATE OF THE ART

The state of the art comprises, in particular, documents WO-A1-2010/092263, FR-A1-2 987 416, EP-A1-1 464 869, FR-A1-3 041 054, FR-A-1 379 451, WO-A1-94/29614 and WO-A2-2009/080030.

Current turbine engines, in particular turbine engines comprising one or more propellers blowing a secondary flow, comprise a transmission system, termed reducer, to drive this or these propellers at the correct rotation speed from the shaft of the power turbine of the primary body of the engine.

The operation of the reducers, in particular on turbine engines with a fan propeller with a high dilution rate, requires a particular high oil flow to ensure the lubrication and the cooling of the pinons and bearings thereof. The oil flow is a function of the architecture and is, for example, around 6000 to 7000 litres per hour on take-off for a particular architecture.

Among the reducers used, there are planetary and epicyclic gear trains, which have the advantage of offering high reduction rates of rotation speed in reduced volumes.

Such a reducer comprises a planetary pinion or central pinion, termed sun gear, an outer ring gear and planet pinions, termed planet gears, which are connected to the sun gear and with the ring gear, the mounting of one of these three components needing to be blocked in rotation for the operation of the gear train.

When the planet-carrier is fixed in rotation, the sun gear and the ring gear are driving and driven, respectively, or conversely. The reducer is thus of the "planetary" type.

In the opposite case of an epicyclic train reducer, the outer ring gear is fixed in rotation and the sun gear and the planet-carrier are driving and driven.

The sun gear and the planet gears can be received in a cage which supports the guide bearings of the planet gears as well as the means for lubricating the planet gears and the sun gear. The sun gear comprises inner splines for coupling with a first shaft of the turbine engine and the cage of the reducer is integral with a cylindrical barrel which comprises outer splines for coupling with another shaft.

The connection of the cage to the barrel is generally rigid. In a variant, a technology in which the cage is connected to the barrel by flexible connections can be considered, such as described in document EP-A1-1 464 869. In such a case, the barrel comprises an annular row of axial arms which are connected by flexible connections to the cage.

It has been proposed to achieve these flexible connections by ball joints, the arms carrying ball joints passed through by fingers extending into axial housings provided at the periphery of the cage.

In operation, during the coupling of the planet-carrier, the arms will bend and transmit the torque to the cage. The ball joints make it possible to not transmit the bending of the arms to the fingers. However, regarding mounting, clearances are present between the fingers and the ball joints. Thus, during deformations, relative displacements between the fingers and the ball joints appear. These relative displacements on metal/metal interfaces generate wear by friction (of the fretting type), which can lead to connections breaking.

The present invention proposes an improvement which provides a simple, effective and economic solution to this problem.

SUMMARY OF THE INVENTION

The invention relates to a cage for a turbine engine speed reducer with a planetary or epicyclic gear train, this cage being configured to contain a central sun gear with an axis of rotation X and an annular row of planet gears arranged around the axis X and engaged with said sun gear, the cage comprising, at the periphery thereof, axial housings intended to receive axial arms integral with a barrel of said reducer, each housing being passed through by a substantially radial finger which is intended to guide in rotation, a ball joint carried by one of said arms, characterised in that each finger comprises means for lubricating said ball joint.

The invention thus proposes to bring oil to the ball joints and in particular, to the ball joint/finger interfaces, so as to lubricate the surfaces in contact thereof and thus to limit the appearance of fretting. The oil is here brought by lubrication means integrated in the guiding fingers of the ball joints.

The cage according to the invention can comprise one or more of the following features, taken individually from one another, or in combination with one another:

each finger comprises a central bore for circulating oil connected to at least one channel extending between said central bore and an outer cylindrical surface of the finger intended to be surrounded by said ball joint; the lubrication means are thus formed simply by bores and channels provided in the guiding fingers of the ball joints;

said central bore opens at a radially internal axial end of said finger, and has, in the cross-section at this end, a truncated shape flared radially inwards; oil can be projected directly into this flared end, and flow, due to the centrifugal forces, into the bore and the channel to the ball joint;

said central bore extends along a cylindrical axial extension of said finger, which extends radially inwards; this extension can be designed to decrease the radial distance between the bore, on the one hand, and the oil source, on the other hand; this oil source is, for example, formed by projection means, such as a nozzle;

said axial extension has an outer diameter less than the diameter of said cylindrical surface, and/or extends radially inwards from an outer annular edge of the finger;

said at least one channel has a substantially radial orientation with respect to the longitudinal axis of said finger, or is inclined with respect to this axis, for example, radially outwards with respect to the axis X of the sun gear; the inclination of the or of each channel is determined according to the zones to be lubricated of the finger, as well as according to the centrifugal forces applied to the oil in operation.

The present invention also relates to a turbine engine speed reducer with a planetary or epicyclic gear train, comprising a cage according to one of the preceding claims and a barrel comprising an annular row of axial arms engaged in the housings of the periphery of the cage, each arm comprising a recess for mounting a ball joint passed through by the finger of said housing.

The reducer according to the invention can comprise one or more of the following features, taken individually from one another, or in combination with one another:

the reducer comprises means for lubricating planet gears which comprise an annular row of oil nozzles extending parallel to the axis X and distributed around this axis X, the nozzles being configured to project oil towards said fingers; the invention thus proposes using nozzles for lubricating planet gears, to lubricate the interfaces between the fingers and the ball joints;

the number of nozzles is equal to the number of fingers and each nozzle extends into a plane passing through the axis X, which also passes through a finger; this makes it possible to simplify the oil supply of the bores of the fingers by the nozzles;

each nozzle comprises an inner bore for circulating oil connected to at least one channel for the passage of oil extending from said bore to at least one orifice for projecting oil located at the periphery of said nozzle and oriented towards one of said fingers; oil is thus projected by the nozzle into the bore of the finger; this oil will then flow to the ball joint due to the centrifugal forces;

said at least one orifice is located at the top of a radial boss of said nozzle; the boss makes it possible to extend the length of said at least one channel and to improve the guiding of the oil before the projection thereof.

The present invention also relates to a turbine engine, in particular for an aircraft, comprising a reducer such as described above.

BRIEF DESCRIPTION OF THE FIGURES

Other features and advantages will emerge from the following description of a non-limiting embodiment of the invention in reference to the appended drawings, in which:

FIG. 3 is a schematic, perspective view of a reducer with an epicyclic gear train, FIG. 4 is a schematic, perspective view of an impeller and of nozzles of the reducer of FIG. 3, FIG. 5 is a schematic, perspective view of a planet-carrier of the reducer of FIG. 3.

DETAILED DESCRIPTION OF AN EMBODIMENT OF THE INVENTION

Figure 1:
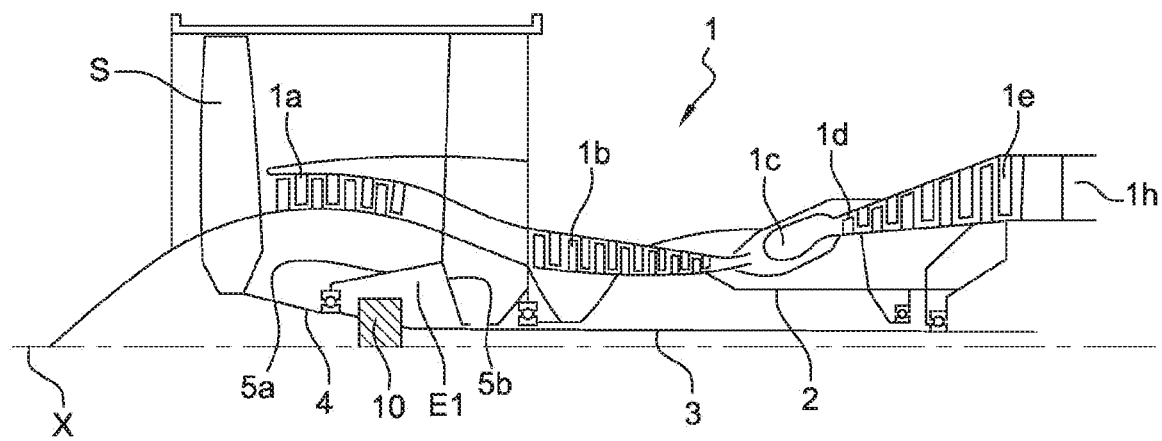
FIG. 1 is a schematic, axial cross-sectional view of a turbine engine using the invention.

FIG. 1 shows a turbine engine 1 which comprises, conventionally, a fan propeller S, a low-pressure compressor 1*a*, a high-pressure compressor 1*b*, an annular combustion chamber 1*c*, a high-pressure turbine 1*d*, a low-pressure turbine 1*e* and an exhaust nozzle 1*h*. The high-pressure compressor 1*b* and the high-pressure turbine 1*d* are connected by a high-pressure shaft 2 and form with it a high-pressure (HP) body. The low-pressure compressor 1*a* and the low-pressure turbine 1*e* are connected by a low-pressure shaft 3 and form with it a low-pressure (LP) body.

The fan propeller S is driven by a fan shaft 4 which is coupled with the LP shaft 3 by means of a reducer 10 with an epicyclic gear train represented here schematically.

The reducer 10 is positioned in the front portion of the turbine engine. A fixed structure schematically comprising here, an upstream portion 5*a* and a downstream portion 5*b* is arranged so as to form an enclosure E1 surrounding the reducer 10. This enclosure E1 is here closed upstream by seals at the level of a bearing making it possible for the fan shaft 4 to pass through, and downstream by seals at the level of the LP shaft 3 passing through.

Figure 2:
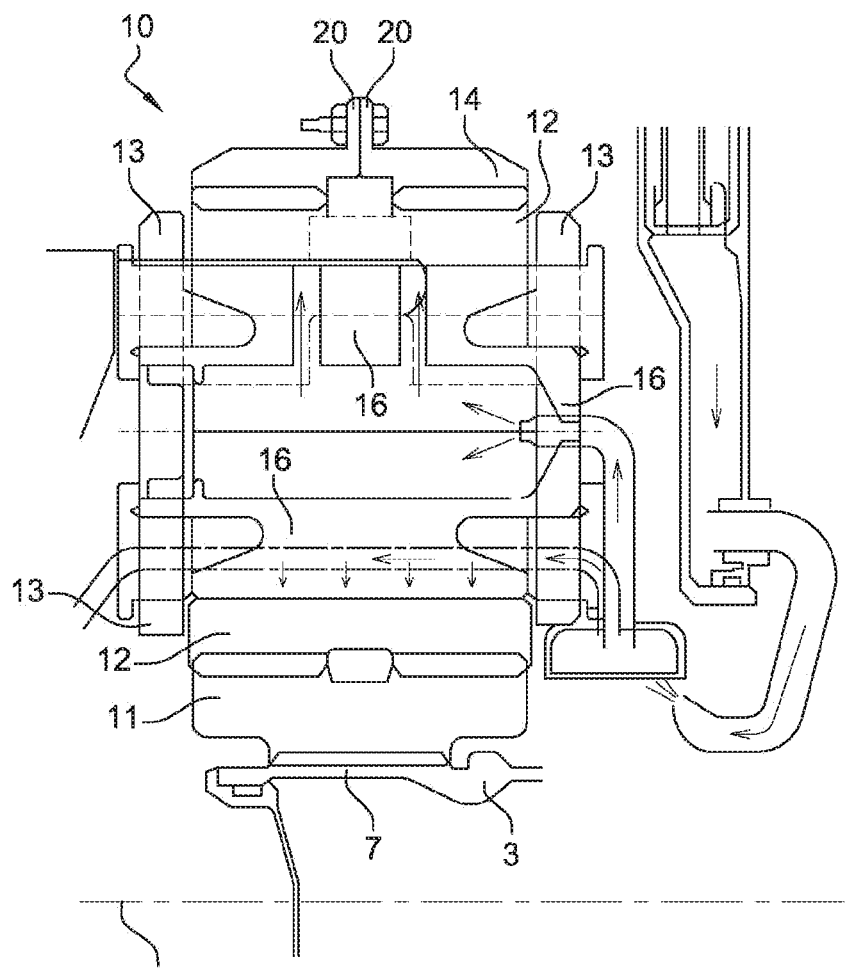
FIG. 2 is a schematic, axial cross-sectional view of a reducer with an epicyclic gear train.

In reference to FIG. 2, the reducer 10 comprises a ring gear 14 which is fixed by way of a ring gear-carrier (not represented) to the fixed structure 5*a*, 5*b* with flexible means arranged to make it possible for it to follow the possible movements of the fan shaft 4, in certain cases of degraded operation, for example. In a planetary architecture, the ring gear-carrier is composed of a more or less flexible portion which drives the ring gear and of a portion maintained by rolling bearings or bearings and on which the fan is mounted. These fixing means are known to a person skilled in the art and are not detailed here. A brief description of it can be found, for example, in FR-A1-2 987 416.

The reducer 10 engages, on the one hand, on the LP shaft 3 by way of splines 7 which drive a planetary gearing pinion or sun gear 11, and on the other hand, on the fan shaft 4 which is attached to a planet-carrier 13. Conventionally, the sun gear 11, of which the axis of rotation X is combined with that of the turbine engine, drives a series of planet pinions or planet gears 12, which are distributed regularly over the circumference of the reducer 10. The number of planet gears 12 is generally defined as between three and six. The planet gears 12 also rotate around the axis X of the turbine engine, except for in the case of a planetary gear where they only rotate around the axes of revolution thereof, by engaging on inner gearings of the ring gear 14, which is fixed to a stator of the turbine engine by way of flanges 20 in the case of an epicyclic gear or fixed to a rotor of the turbine engine in the case of a planetary gear. Each of the planet gears 12 rotate freely around a planet axis 16 connected to the planet-carrier 13, using a bearing which can be a plain bearing, as represented in FIG. 2, or a bearing with rolling elements (ball or roller bearings).

The rotation of the planet gears 12 around the planet axis 16 thereof, due to the engagement of the pinons thereof with the gearings of the ring gear 14, drives the rotation of the planet-carrier 13 around the axis X, and consequently that of the fan shaft 4 which itself is linked to a rotation speed which is less than that of the LP shaft 3.

FIG. 2 shows the route of the oil to the reducer 10 and the path thereof inside it. Arrows show in FIG. 2, the path followed by the oil from, in this example, a buffer tank linked to the fixed structure of the turbine engine, to the pinions and to the bearings to be lubricated. The lubrication device conventionally comprises three portions: a first portion linked to the fixed structure and delivering oil to the rotating portions of the reducer 10, an impeller rotating with the planet-carrier 13 receiving this oil in the case of an epicyclic gear and a distributor assembled to the planet-carrier, which are fixed on a planetary architecture, and circuits for distributing oil supplied with oil by the impeller to route it to the places to be lubricated.

FIGS. 3 to 5 illustrate a more concrete example of a reducer 10 here with an epicyclic gear train.

The reference 130 designates the planet-carrier of the reducer 110, which is here of the one-piece type comprising a portion forming a cage 134 and a portion forming a barrel 142. The cage comprises two coaxial annular walls 136, 138, connected to the periphery thereof by a cylindrical wall 140.

The annular wall 136 is integral with the substantially cylindrical barrel 142, partially visible, comprising means for engaging with a fan disk of the turbine engine. The coupling means are, for example, longitudinal splines.

In the example shown, the cylindrical wall 140 is perforated and comprises spaces 143 passing through in the radial direction making it possible to mount planet gears.

The wall 138 comprises a central opening 144 (making it possible for the mounting of the sun gear) centered on the axis X and a series of orifices 146 regularly distributed around the axis X, the opening 144 and the orifices 146 passing through in the axial direction (FIG. 5).

The orifices 146 are used to mount axles 148 of rotation of the planet gears 150. The axles 148 are parallel to the axis X and are mounted in the cage 134 by axial translation by passing through the orifices 146. They are fixed to the longitudinal ends thereof on the walls 136, 138, respectively.

The planet gears 150 are mounted in rotation on the axles 148 are have the outer peripheries thereof which partially pass through the spaces 143 in view of the engagement thereof with the outer ring gear of the reducer intended to surround the cage 134.

The planet gears 150 engage with the sun gear 151 which comprises inner rectilinear splines 151a for coupling with another shaft such as a turbine shaft.

An impeller 120 is attached and fixed on the wall 138, on the side of the outer face thereof, i.e. that which is not located on the side of the planet gears 150. The impeller 120 has the function of lubricating the reducer 110 and comprises lubrication means configured to bring lubricant to the nozzles 172 and to the axles 148 and bearings 149. The oil supply of the nozzles makes it possible to lubricate the gearing teeth of the planet gears 150 and of the sun gear 151.

The impeller 120 has a general annular shape and comprises arms 120a radially protruding outwards, five of them in the example shown. The impeller 120 is intended to be coaxially mounted on the wall 138 and comprises a face 120b for supporting and fixing on this wall.

The impeller 120 comprises a central opening 120c delimited externally by an annular portion defining two coaxial annular recesses 158a, 158b, arranged axially next to one another. These recesses 158a, 158b extend around the axis X and open radially inwards. The radially outer bottom wall thereof comprises orifices in fluid communication with radial channels 160, on the one hand, and radial conduits 162, on the other hand.

Although this is not shown, oil is intended to be projected in the recesses 158a, 158b by means for supplying lubricant. These means generally comprise a series of injectors which are arranged around the axis X and pass through the openings 120c, 144. The injectors are carried by a stator and spray lubricant radially outwards directly into the recesses 158a, 158b, which will then flow into the channels 160 and conduits 162.

Each of the conduits 162 communicates, at the radially outer end thereof, with a cavity of an axle 148 to supply lubricant to this axle 148 and to the associated bearing 149. The lubricant brought by the conduits 162 is intended to be injected into the cavities, then to flow through the above-mentioned conduits to the periphery of the bearings 149.

Each of the channels 160 communicates at the radially outer end thereof with a longitudinal end of a nozzle 172 which can be seen, in particular, in FIG. 4. The nozzles 172 have an extended shape and extend parallel to the axis X. The extension axes thereof are referenced B. There are five of them and are regularly distributed around the axis X by each being arranged between two adjacent axles 148.

Each nozzle 172 comprises orifices 176 for projecting oil onto the gearings of the planet gears 150.

The nozzles 172 are fixed to the impeller 120 by means of screwed pads 175, and the impeller 120 is attached and fixed by screws on the annular wall 138 of the planet-carrier 130.

Figure 6:
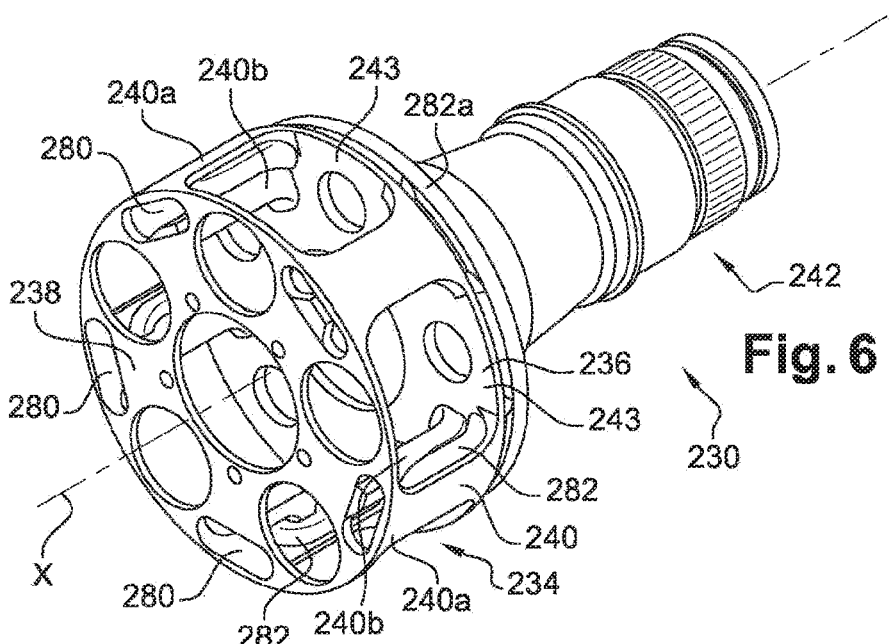
FIG. 6 is a schematic, perspective view of a planet-carrier of a reducer according to the invention.

In FIG. 6 onward, the elements already described above are designated by the same reference numbers increased by one hundred.

Figure 7:
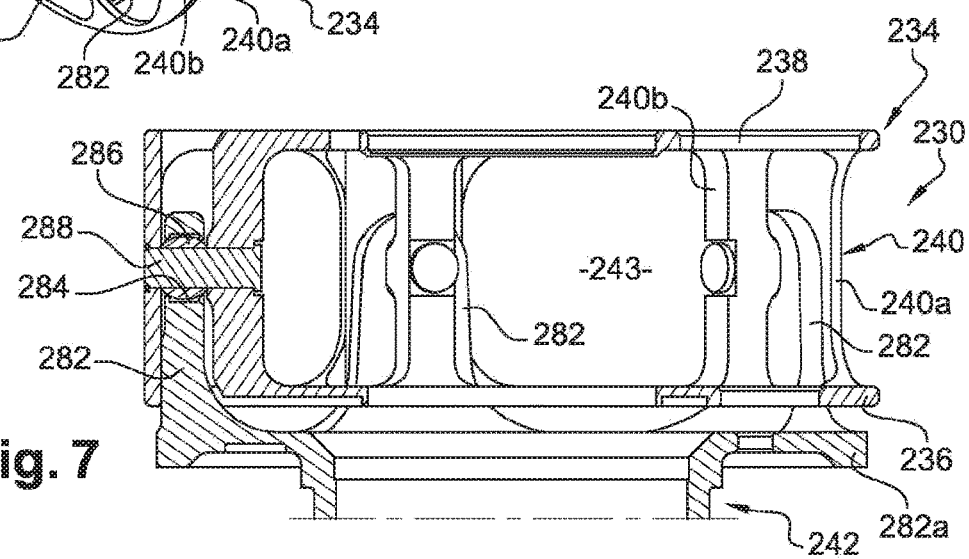
FIG. 7 is a partial schematic, axial cross-sectional view, on a larger scale, of a portion of the planet-carrier of FIG. 6.
Figure 8:
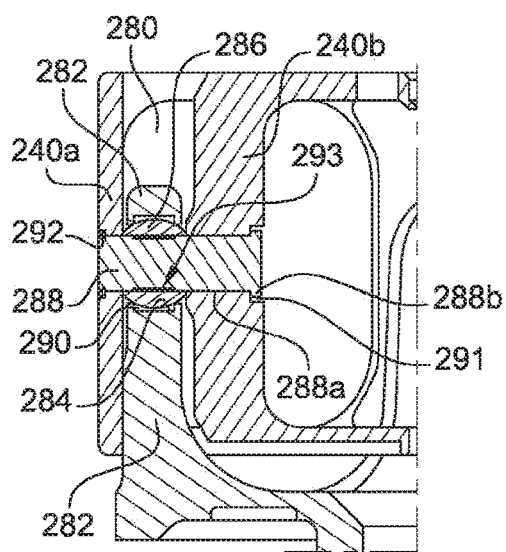
FIG. 8 is a view on a larger scale of a portion of FIG. 7, without the improvement proposed by the invention.

FIGS. 6 to 8 shown another planet-carrier 230 technology, in which the cage 234 and the barrel 242 are connected by connections to ball joints.

The cylindrical wall 240 of the cage 234 is here of the double-skin type and comprises an outer skin 240a interrupted by spaces 243 and an inner skin 240b interrupted by the same spaces 243.

Each of the skins 240a, 240b is formed by an annular row of longitudinal strips of material which extends substantially perpendicularly to the axis X. The material strips of the skins are radially aligned and together define inter-skin housings 280 which open axially onto the walls 236, 238 of the cage. The housings 280 also open circumferentially, between the skins 240a, 240b.

The cylindrical wall 240 of the cage thus comprises an annular row of housings 280. These housings 280 receive axial arms 282 integral with a substantially radial annular wall 282a of the barrel 242. The wall 282a is located at an axial end of the barrel 242, opposite the coupling splines thereof. The arms 282 extend axially from the wall 282a and are engaged by axial translation in the housings 280.

Each arm 282 here has a flattened shape of which the thickness is determined according to the inter-skin distance, i.e. to the radial thickness of the housings 280. Each arm 282 further comprises a substantially U-shaped peripheral edge, this peripheral edge having, in the transversal cross-section, a general convex curved shape. This makes it possible to limit the sharp edges of the arms 282 and therefore the risk of deterioration by contact with the cage 234.

Each arm 282 comprises, substantially in the environment thereof, a hole 284 for mounting a ball joint 286 intended to be passed through by a finger 288 carried by the cage 234.

The hole 284 has a substantially radial orientation with respect to the axis X. It has a general cylindrical shape and receives a ring 290 for guiding the ball joint 286. The cage 234 and the ball joint 286 have a thickness, measured in a radial direction with respect to the axis X, which is less than the inter-skin distance or the radial thickness of the housing 280, so as to be able to be engaged in this housing together with the arm 282 for supporting these parts.

Each housing 280 is passed through by a finger 288 which has a substantially radial orientation with respect to the axis X. Each finger 288 comprises a cylindrical body 288a connected to an axial end, here radially inner, to an outer annular edge 288b. The finger 288 is here engaged by radial translation from the inside through radial orifices of the skins 240a, 240b, the edge 288b thereof being intended to radially bear on a cylindrical support 291 of the inner skin 240b. The cylindrical body 288a comprises, at the axial end thereof opposite the edge 288b, an annular groove for mounting a locking ring 292. This locking ring 292 is intended to bear radially on a cylindrical support of the outer skin 240a. After inserting the finger 288 in the orifices of the skins, until supporting the edge 288b on the support 291, the ring 292 is mounted in the groove of the body 288a to radially lock the finger 288 opposite the skins 240a, 240b.

As can be seen in FIG. 8, the ball joint 286 surrounds a cylindrical surface 293 of the finger 288 which can be the object of fretting in operation. To limit or suppress this phenomenon, the invention proposes to integrate the finger 288 with the means for lubricating the ball joint 286.

Figure 9:
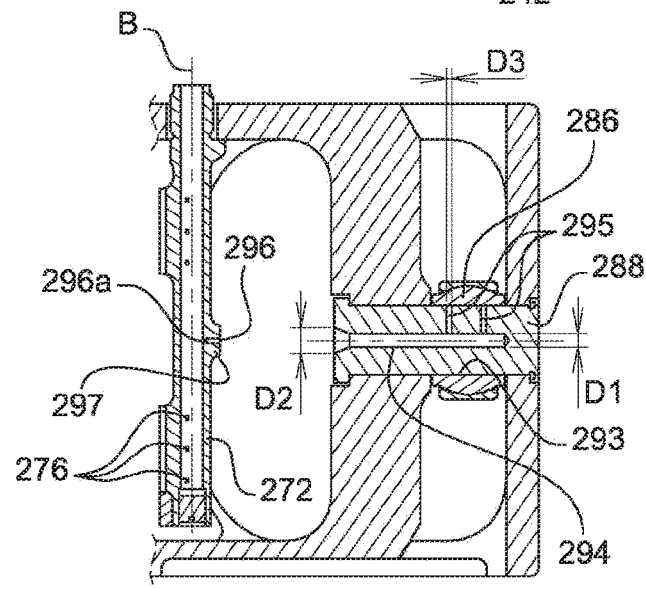
FIG. 9 is a view on a larger scale of a portion of FIG. 7, with the improvement proposed by the invention.

FIG. 9 shows a first embodiment of the invention in which the finger 288 comprises a central bore 294 for circulating oil connected to at least one channel 295 extending between the central bore and the cylindrical surface 293 of the finger intended to be surrounded by the ball joint 286.

The bore 294 extends along the axis of the finger 288, over a major portion of the length of it. It has an inner diameter referenced D1. The bore comprises an axial end, located radially outwards, with respect to the axis X, which is closed, and an opposite axial end, located radially inwards, which has, in cross-section, a truncated shape flared radially towards the axis X. This truncated shape has a small base of diameter D1 and a large base of diameter D2, greater than D1.

The number of channels 295 and the diameter thereof, referenced D3, are predetermined. Here, there are two of them, and extending radially with respect to the axis of the finger 288, in the same plane passing through this axis. They open at an end in the bore 294 and at the opposite end on the surface 293.

As can be seen in FIG. 9, the plane passing through the axis X and through the axis of the finger 288 also passes through the axis B of a nozzle 272. In addition, orifices 276 for projecting oil towards the gearings of the planet gears, the nozzle 272 comprises at least one orifice 296 for projecting oil towards the finger 288, and in particular, towards, the flared end of the bore 294 thereof.

The orifice 296 is here formed by the radially outer outlet of a channel 296a for the passage of oil into the tubular wall of the nozzle 272. This channel 296 extends into a radial boss 297 of this tubular wall and has a length which is sufficient to orient and guide oil towards the bore 294. As can be seen in FIG. 9, the orifices 276 of the nozzle are oriented rather radially inwards, while the orifice(s) 296 thereof are oriented rather radially outwards. The orifices 276, 296 are supplied by an inner bore for circulating oil from the nozzle 272.

It is therefore understood that each finger 288 is associated with a nozzle 272 and lubricated by this nozzle 272. In other words, the number of fingers 288 is equal to the number of nozzles 272, which is equal to five in the example shown. In addition, as mentioned above, the axes of the finger 288 and of the associated nozzle 272 are located in the same plane passing through the axis X.

Figure 10:
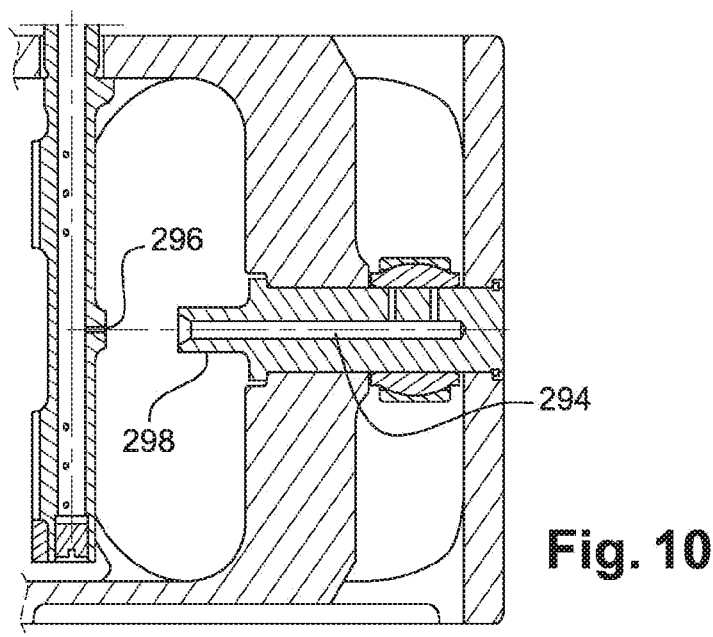
FIG. 10 is a view similar to that of FIG. 9 and illustrating an embodiment of the invention.

FIG. 10 represents an embodiment variant of the invention wherein the finger 288 comprises a radially inner cylindrical extension 298. The bore 294 extends into this extension 298, which makes it possible to extend the latter and in particular, to reduce the radial distance between the projection orifice 296 and the flared end of the bore 294.

FIG. 10 shows that the extension 298 has an outer diameter less than the diameter of said cylindrical surface 293 and extends radially inwards from the edge 288b of the finger 288.

In operation, oil is projected through the orifice 296 in the direction of the bore 294 (arrow 299). The nozzle 272 and the finger 288 are integral in rotation with the planet-carrier and therefore rotate at the same speed. The oil projected by the nozzle is centrifuged and is received in the bore. It will then flow radially from inside outwards to the channels 295 (arrows 300), to then be routed to the surface 293, always under the effect of centrifugal forces.

Figure 12:
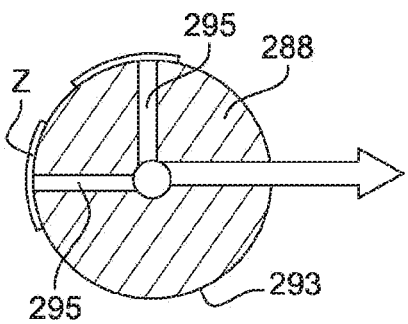
FIG. 12 is a very schematic, transversal cross-sectional view of a ball joint guiding finger.

The channels 295 can be oriented such that the outlets thereof on the surface 293 are located upstream and/or downstream from the preferred zone Z for applying the fretting type load, and/or at the level of this zone Z (see FIG. 12).

Figure 13:
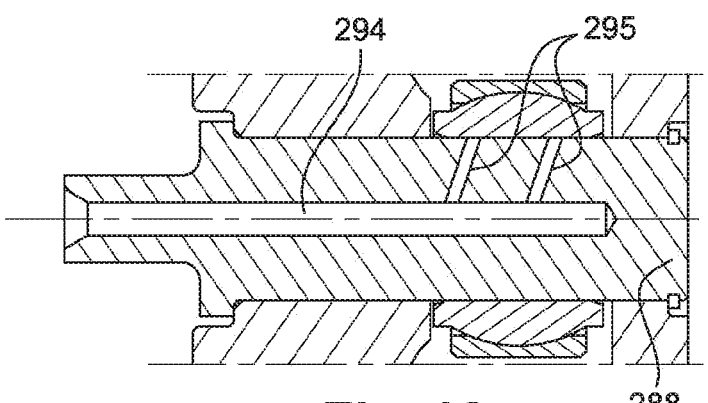
FIG. 13 is a view similar to that of FIG. 11 and illustrating another embodiment of the invention.

The channels 295 can also be oriented in directions facilitating the flow of the oil to the surface 293, such as for example, radially outwards with respect to the axis X, as shown in FIG. 13.

Figure 11:
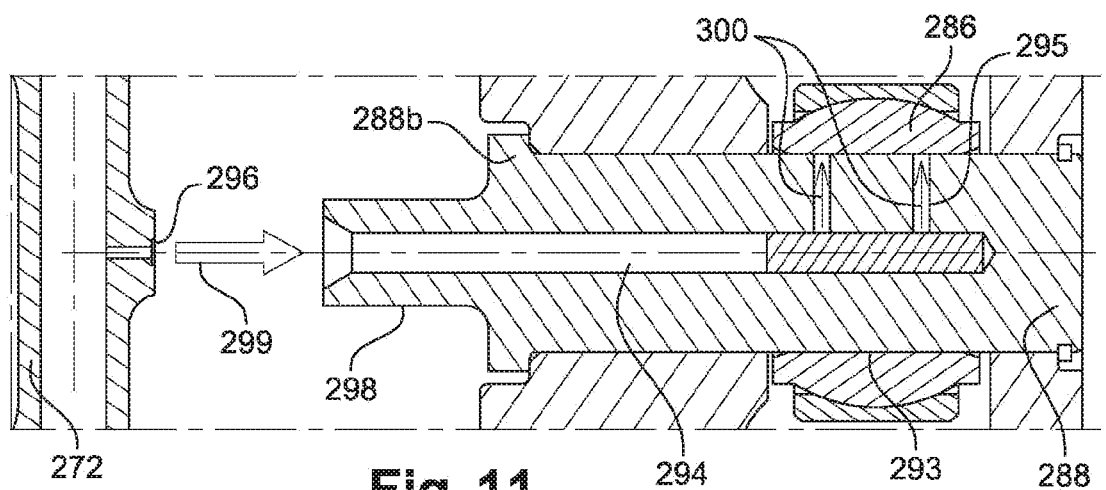
FIG. 11 is a view on a larger scale of a portion of FIG. 10.

The solution proposed by the invention thus consists of bringing oil to the finger/ball joint interfaces to lubricate the surfaces 293 and thus limit the appearance of fretting. Hardly any oil can be needed for suppressing fretting on this interface, but in the present case, oil must be brought onto a rotating portion, and in a part not provided to be supplied with oil. To bring oil into this zone, nozzles 272 are used in the example shown, which are relatively close. These nozzles bring pressurised oil to the gearings of the reducer to cool and lubricate the gearings in operation. In the example proposed, the solution therefore consists of producing at least one additional orifice 296 in the nozzle to have an oil jet which starts in the direction of the guiding finger 288 of the ball joint 286. Given that it is found in a centrifugal field (rotating parts), the oil jet will have a trajectory which initially will follow the centrifugal field. The oil is then guided to the interface to be lubricated by way of the bore 294 and of the channels 295. With the finger being subjected to the centrifugal field, any oil drop which enters into the bore 294 will be forced to flow to the interface by the centrifugal field and therefore ensuring the lubrication of the interface. The flared shape at the inlet of the bore makes it possible to capture a maximum of oil and therefore to maximise the oil supply of the finger 288. According to the architecture, it is possible that the nozzle 272 is too far away to correctly supply the finger 288. Indeed, the change of reference and the relative wind can burst the oil jet to a certain distance from the nozzle. If this distance is less than the distance separating the finger from the nozzle, the oil will not get to the finger. The variant of FIG. 11 makes it possible to extend the finger 288 to receive the oil before the jet bursts.

The invention claimed is:

1. A planet-carrier cage for a turbine engine speed reducer with a planetary or epicyclic gear train, this cage being configured to contain a central sun gear with an axis X of rotation and an annular row of planet gears arranged around the axis X and engaged with said sun gear, the cage comprising, at the periphery thereof, axial housings intended to receive axial arms integral with a barrel of said reducer, each housing being passed through by a substantially radial finger which is intended to guide in rotation a ball joint carried by one of said arms, wherein each finger comprises means for lubricating said ball joint, wherein the means for lubricating said ball joint of each finger comprises a central bore for circulating, oil connected to at least one channel extending between said central bore and an outer cylindrical surface of the finger intended to be surrounded by said ball joint.

2. The cage according to claim 1, wherein said central bore opens at a radially internal axial end of said finger, and has, in the cross-section at this end, a truncated shape flared radially inwards.

3. The cage according to claim 1, wherein said central bore extends along a cylindrical axial extension of said finger, which extends radially inwards.

4. The cage according to claim 3, wherein said axial extension has an outer diameter less than the diameter of said cylindrical surface, and/or extends radially inwards from an outer annular edge of the finger.

5. The cage according to claim 1, wherein said at least one channel has a substantially radial orientation with respect to the longitudinal axis of said finger, or is inclined with respect to this axis, for example radially outwards with respect to the axis X of the sun gear.

6. A turbine engine speed reducer with a planetary or epicyclic gear train, comprising a planet-carrier cage and a barrel, said cage being configured to contain a central sun gear with an axis X of rotation and an annular row of planet gears arranged around the axis X and engaged with said sun gear, said barrel comprising an annular row of axial arms, said cage comprising, at the periphery thereof, axial housings to receive said axial arms of said barrel, each said housing being passed through by a substantially radial finger to guide in rotation a ball joint carried by one of said arms, wherein each finger comprises means for lubricating said ball joint, each arm comprising a hole for mounting said ball joint passed through by the finger of each said housing, wherein the means for lubricating said ball joint of each finger comprises a central bore for circulating oil connected to at least one channel extending between said central bore and an outer cylindrical surface of the linger intended to be surrounded by said ball joint.

7. The reducer according to claim 6, wherein the speed reducer comprises means for lubricating planet gears which comprise an annular row of oil nozzles extending parallel to the axis X and distributed around said axis X, the nozzles being configured to project oil to said fingers.

8. The reducer according to claim 7, wherein the number of nozzles is equal to the number of fingers and each nozzle extends in a plane passing through the axis X, which also passes through one of said fingers.

9. The reducer according to claim 7, wherein each nozzle comprises an inner bore for circulating oil connected to at least one channel for the passage of oil extending from said bore to an orifice for projecting oil located at the periphery of said nozzle and oriented towards one of said fingers.

\* \* \* \* \*